United States Patent
Vishne et al.

(10) Patent No.: US 9,658,966 B2
(45) Date of Patent: May 23, 2017

(54) SYSTEMS AND METHODS OF WRITE CACHE FLUSHING

(71) Applicant: SANDISK TECHNOLOGIES INC., Plano, TX (US)

(72) Inventors: Gadi Vishne, Petah-Tikva (IL); Eran Erez, San Jose, CA (US); Roman Rozental, Netanya (IL); Polina Marimont, Modiin (IL); Judah Gamliel Hahn, Ofra (IL)

(73) Assignee: Sandisk Technologies LLC, Plano, TX (US)

( * ) Notice: Subject to any disclaimer, the term of this patent is extended or adjusted under 35 U.S.C. 154(b) by 184 days.

(21) Appl. No.: 14/551,980

(22) Filed: Nov. 24, 2014

(65) Prior Publication Data

US 2016/0147671 A1    May 26, 2016

(51) Int. Cl.
| | | |
|---|---|---|
| *G06F 12/00* | (2006.01) | |
| *G06F 12/12* | (2016.01) | |
| *G06F 12/0844* | (2016.01) | |
| *G06F 12/02* | (2006.01) | |
| *G06F 12/0868* | (2016.01) | |

(52) U.S. Cl.
CPC ......... *G06F 12/12* (2013.01); *G06F 12/0844* (2013.01); *G06F 12/0246* (2013.01); *G06F 12/0868* (2013.01); *G06F 2212/1041* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 7,562,181 B2 | 7/2009 | Sinclair et al. | |
| 7,970,989 B2 * | 6/2011 | Matthews | G06F 3/0619 410/36 |
| 8,990,493 B1 * | 3/2015 | Yu | G06F 3/06 711/104 |
| 9,317,204 B2 * | 4/2016 | Hahn | G06F 3/0659 |
| 2011/0252201 A1 * | 10/2011 | Koren | G06F 11/1448 711/135 |
| 2011/0283066 A1 * | 11/2011 | Kurashige | G06F 12/0866 711/135 |

FOREIGN PATENT DOCUMENTS

WO    2013147923 A1    10/2013

OTHER PUBLICATIONS

"NVM Express", Revision 1.1b, Jul. 2, 2014, 172 pages.

\* cited by examiner

*Primary Examiner* — Brian Peugh
(74) *Attorney, Agent, or Firm* — Kunzler Law Group

(57) ABSTRACT

A data storage device includes a write cache, a non-volatile memory, and a controller coupled to the write cache and to the non-volatile memory. The controller is configured to, responsive to receiving a command to flush particular data from the write cache, attempt to fill a write block of data using the particular data and pending data obtained after receipt of the command.

20 Claims, 5 Drawing Sheets

SYSTEMS AND METHODS OF WRITE CACHE FLUSHING

FIELD OF THE DISCLOSURE

The present disclosure is generally related to flushing a write cache of a data storage device.

BACKGROUND

Generally, data storage devices are configured to write data to multiple storage elements concurrently, rather than, for example, writing data to one storage element at a time. For such data storage devices, the smallest set of storage elements that can be written at a time may be referred to as a write block. Since individual write commands may be associated with less than a full write block of data, a data storage device may store data that is to be written to a non-volatile memory in a volatile cache. After sufficient data is available in the cache to fill a write block, a full write block of data may be written from the volatile cache to the non-volatile memory.

In certain circumstances, a device (e.g., a host) coupled to the data storage device may issue a command to clear the cache (such as a flush command), or the device may issue a write command that includes a force unit access flag indicating that data associated with the write command is to be indicated as complete only after the data is written to non-volatile memory. When either of these commands is received, the data storage device may add padding to the data that is to be written to the non-volatile memory (e.g., the data in the cache or the data associated with the flagged write command) in order to generate a padded full write block of data, and the padded full write block of data may be written to the non-volatile memory. Since the padding is not data received from the host, storing the padding in the non-volatile memory is an inefficient use of storage capacity of the non-volatile memory.

SUMMARY

In a particular embodiment, a data storage device includes a controller, a non-volatile memory and a volatile write cache. The controller is configured to attempt to fill a write block using data associated with pending write commands (e.g., write commands that have been issued but for which corresponding data has not been written to the non-volatile memory) after receiving a command to clear the write cache (such as a flush command) or after receiving a write command that includes a force unit access (FUA) flag. If the controller is able to identify data associated with a pending write command to add to data in the write cache, a full write block of data can be written to the non-volatile memory without padding (or with less padding), improving efficiency of use of the storage capacity of the non-volatile memory.

When the command to clear the cache or a FUA-enabled write command is received, the controller may start a timer. The controller may attempt to fill the write block until the timer expires, after which the controller may add padding to the data to fill the write block. Using the timer is a precaution to avoid significant delays while the controller attempts to fill the write block with data associated with pending write commands.

DETAILED DESCRIPTION

Figure 1:
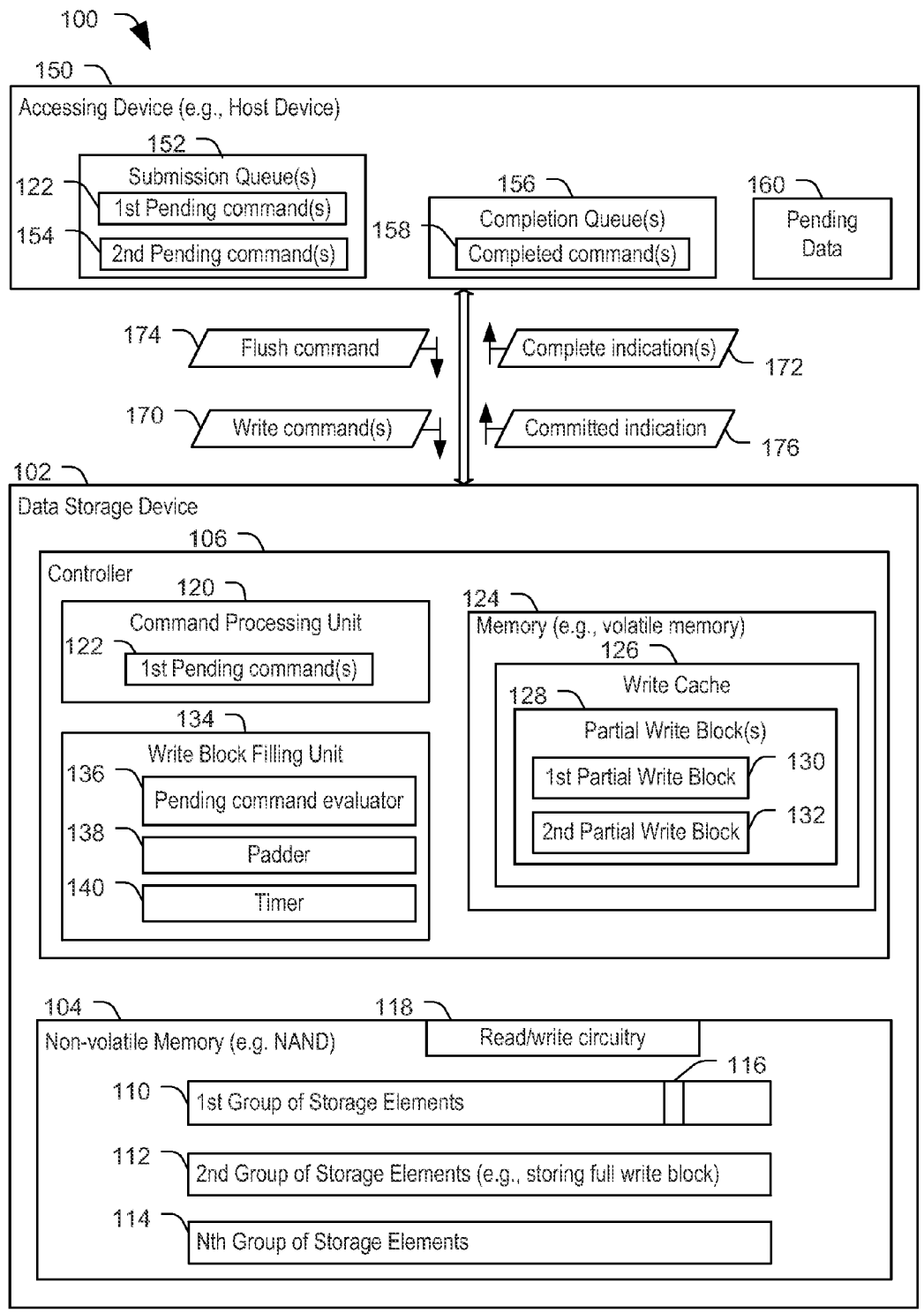
FIG. 1 is a block diagram of a first particular embodiment of a system including a data storage device configured to attempt to fill a write block using data associated with pending write commands.

FIG. 1 is a block diagram of a first particular embodiment of a system 100 including a data storage device 102 configured to attempt to fill a write block using data associated with pending write commands. The data storage device 102 includes a controller 106 and a non-volatile memory 104. In a particular implementation, the non-volatile memory 104 is on a memory die that is separate from the controller 106 and is coupled to the controller 106 via a bus. In other implementations, the non-volatile memory 104 and the controller 106 are on a common die.

The non-volatile memory 104 may be use storage elements based on various memory technologies, such as, a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memory technologies), a Resistive Random Access Memory (RRAM or ReRAM), or any other type of memory technologies. The storage elements of the non-volatile memory 104 may be configured according to various architectures, such as, a byte modifiable architecture or a non-byte modifiable architecture (e.g., a page modifiable architecture); although, particular embodiments disclosed herein may be especially beneficial when used with non-byte modifiable architectures. The non-volatile memory 104 may have a three-dimensional (3D) memory configuration, such as a vertical bit line (VBL) 3D architecture. For example, the non-volatile memory 104 may include a 3D VBL ReRAM. In a particular implementation, the non-volatile memory 104 has a 3D memory configuration that is monolithically formed in one or more physical levels of arrays of memory cells having an active area disposed above a silicon substrate. Alternatively, the non-volatile memory 104 may have another configuration, such as a two-dimensional (2D) memory configuration or a stacked 2D memory configuration.

The data storage device 102 may be configured to interface with an accessing device 150 (e.g., a host device or another device that communicates directly or via a network with the data storage device 102). The accessing device 150 may be configured to provide data to the data storage device 102 for storage at the non-volatile memory 104 and to request data to be read from the non-volatile memory 104. For example, the accessing device 150 may include a mobile telephone, a music player, a video player, a gaming console, an electronic book reader, a personal digital assistant (PDA), a computer, such as a laptop computer, notebook computer, or tablet, any other electronic device, or any combination thereof.

The accessing device 150 may communicate via a memory interface that enables reading from the data storage device 102 and writing to the data storage device 102. For example, the accessing device 150 may operate in compliance with Non-Volatile Memory express (NVMe) specification, a Small Computer System Interface (SCSI) specification. In another example, the accessing device 150 may operation in compliance with a Joint Electron Devices Engineering Council (JEDEC) industry specification, such as an embedded MultiMedia Card (eMMC) specification. As other examples, the accessing device 150 may operate in compliance with a Universal Flash Storage (UFS) Host Controller Interface specification, with a Universal Serial Bus (USB) specification, or with a Secure Digital (SD) Host Controller specification, as illustrative examples. Alternatively, the accessing device 150 may communicate with the data storage device 102 via a network using a network protocol, such as a Network File System (NFS) protocol, a Common Internet File System (CIFS) protocol, a Hypertext Transfer Protocol (HTTP), a Hypertext Transfer Protocol Secure (HTTPS), a File Transfer Protocol (FTP), a Secure File Transfer Protocol (SFTP), a Point to Point Protocol (PPP), an Internet Protocol (IP), a Transmission Control Protocol (TCP), another communication protocol, or a combination thereof.

In a particular embodiment, the data storage device 102 is configured to be coupled to the accessing device 150 as embedded memory. In another particular embodiment, the data storage device 102 is a removable device that is coupled to the accessing device 150. For example, the data storage device 102 may be a memory card. The data storage device 102 may operate in compliance with a JEDEC industry specification, one or more other specifications, or a combination thereof. For example, the data storage device 102 may operate in compliance with a USB specification, a UFS specification, an SD specification, or a combination thereof. In yet another particular embodiment, the data storage device 102 is coupled to the accessing device 150 indirectly, e.g., via a network. For example, the data storage device 102 may be a network-attached storage (NAS) device or a component (e.g. a solid-state drive (SSD) device) of a data center storage system, and Enterprise storage system or a storage area network.

In a particular embodiment, the controller 106 includes a memory 124 (e.g., a volatile memory). The memory 124 of the controller 106 may be used to stage data or commands for processing by the controller 106. For example, the memory 124 may include a write cache 126. When data to be written to the non-volatile memory 104 is received at the controller 106, the data may be staged (e.g., stored) at the write cache 126. The write cache 126 may be used to aggregate data to fill write blocks before the full write blocks are written to the non-volatile memory 104. Thus, the data in the write cache 126 may include one or more partial write blocks 128, e.g., a first partial write block 130 and a second partial write block 132. If data added to the write cache 126 is aggregated with one of the partial write blocks 128 to fill the write block, the full write block is written to the non-volatile memory 104.

The controller 106 also includes a command processing unit 120. The command processing unit 120 is configured to obtain (e.g., receive or retrieve) commands from the accessing device 150 and to execute the commands. For example, the command processing unit 120 may interact with the accessing device 150 according to a Non-Volatile Memory Express (NVMe) protocol. In this example, the command processing unit 120 may fetch commands (such as write commands 170, read commands, or other commands) from a submission queue 152 of the accessing device 150. The command processing unit 120 may store one or more of the commands as pending commands. As used herein, a pending command is a command that has been submitted by the accessing device 150 (e.g., is identified in one of the submission queues 152) and that has not been indicated by the controller 106 as complete (e.g., is not identified in one of the completion queues 156). For example, pending commands may include first pending commands 122 and second pending commands 154. The first pending commands 122 correspond to commands that have been copied to a memory (e.g., a volatile memory) of the data storage device 102 from one of the submission queues 152. The second pending commands 154 correspond to other commands of the pending commands (i.e., commands that have been submitted and that have not yet been copied to a memory of the data storage device 102 as first pending commands 122). Although the first pending commands 122 are illustrated as stored at the command processing unit 120 (e.g., at a volatile memory (not shown) of the command processing unit 120), in some examples, the command processing unit 120 may store the first pending commands 122 at a portion of the memory 124 of the controller 106.

Each pending write command of the pending commands may be associated with pending data, such as pending data 160, which may be stored at a memory of the accessing device 150. When the command processing unit 120 executes a pending write command of the first pending commands 122, the pending data 160 associated with the pending write command may be obtained from the accessing device and either written to the non-volatile memory 104 (e.g., if the pending data 160 fills a write block) or written to the memory 124 of the controller 106 (e.g., if the pending data 160 is added to or used to form a partial write block). When the pending data 160 associated with a particular write command is obtained by the controller 106, whether the pending data 160 is written to the non-volatile memory 104 or is written to the memory 124, the particular write command may be indicated to be complete. For example, the command processing unit 120 may generate a complete indication 172 associated with the particular write command. To illustrate, the controller 106 may update a completion queue 156 of the accessing device 150 based on the complete indication 172. In a particular embodiment, the complete indication 172 indicates to the accessing device 150 that the data storage device 102 has received the data associated with the command. The complete indication 172 does not indicate that the data has been written to the non-volatile memory 104. To illustrate, when the write command 170 is received, the data storage device 102 may provide the complete indication 172 to the accessing device 150 while data identified by the write command 170 is staged at the write cache 126, before the data is written to the non-volatile memory 104. Additionally, after obtaining the pending data 160 associated with the particular write command, the particular write command may be removed from the list of pending commands. For example, the particular write command may be removed from the memory 124 or from a memory of the command processing unit 120 that stores the first pending commands 122.

In a particular embodiment, the write cache 126 is maintained in volatile memory. Thus, loss of power may result in loss of data in the write cache 126. Since data in the write cache 126 is associated with commands indicated as complete, to keep an accurate record of data written to the non-volatile memory 104 (not just to the write cache 126), the accessing device 150 may occasionally issue a flush command 174. The flush command 174 instructs the data storage device 102 to write all data that is stored in the write cache 126 to the non-volatile memory 104. After the data in the write cache 126 is written to the non-volatile memory 104, the data storage device 102 may generate an output indicating completion of the flush command 174. For example, the data storage device 102 may provide a committed indication 176. The committed indication 176 may indicate to the accessing device 150 that all data associated with write commands previously identified in the completion queue 156 has been written to the non-volatile memory 104. In a particular embodiment, the committed indication 176 corresponds to a completed indication associated with a flush command. To illustrate, in the NVMe specification, flush commands and write commands each follow the same process flow. Thus, the flush command may be submitted to one of the submission queues 152 and copied to the data storage device 102 as a pending command. When the flush command is executed (e.g., when all data in the write cache 126 has been written to the non-volatile memory 104), the controller 106 may indicate the flush command as complete by updating a completion queue associated with the flush command.

Another mechanism that may be used by the accessing device 150 to track which data is written to the non-volatile memory 104 is a force unit access (FUA) flag. When a write command, such as the write command 170, includes a FUA flag, the command processing unit 120 does not provide a corresponding complete indication 172 until the data associated with the FUA-enabled write command has been written to the non-volatile memory 104.

In a particular embodiment, the controller 106 includes a write block filling unit 134. The write block filling unit 134 may include circuitry or instructions executable by a processor to attempt to fill the partial write blocks 128 in the write cache 126 after a flush command is received or after a FUA-enabled write command is received. For example, the write block filling unit 134 may include a pending command evaluator 136. The pending command evaluator 136 is configured to evaluate pending commands, such as the first pending commands 122, the second pending commands 154, or both, to determine whether data associated with a pending write command can be added to a partial write block, such as the first partial write block 130 or the second partial write block 132, to generate a full write block of data. The write block filling unit 134 may also include a timer 140 and a padder 138. The timer 140 may be initialized when a flush command or a FUA-enabled write command is received. The write block filling unit 134 may continue to evaluate pending commands to attempt to fill partial write blocks in the write cache 126 until expiration of the timer 140. After expiration of the timer 140, if any partial write blocks in the write cache 126 are not filled with data, the padder 138 fills these partial write blocks with padding. The full write blocks of data (whether filled using data associated with pending commands, with padding, or with both) are then written to the non-volatile memory 104.

In a particular embodiment, the non-volatile memory 104 includes a plurality of storage elements, which are grouped into sets of storage elements. In the embodiment illustrated in FIG. 1, each group of storage elements 110, 112, 114 corresponds to a full write block of data. For example, the first group of storage elements 110 may be sized to store one full write block of data. Each group of storage elements 110, 112, 114 includes multiple individual storage elements (such as storage element 116). Each individual storage element may be configured to operate as a single bit cell (SBC) or as a multibit cell (MBC). The non-volatile memory 104 may also include support circuitry, such as read/write circuitry 118, to support operation of one or more memory dies of the non-volatile memory. Although depicted as a single component, the read/write circuitry 118 may be divided into separate components, such as read circuitry and write circuitry. The read/write circuitry 118 may be external to one or more memory dies of the non-volatile memory 104. Alternatively, one or more individual memory dies may include corresponding read/write circuitry that is operable to read from and/or write to storage elements within the individual memory die independent of any other read and/or write operations at any of the other memory dies.

During operation, one or more commands issued by the accessing device 150 may be identified in one of the submission queues 152 of the accessing device 150. The commands may include one or more write commands, such as the write commands 170. The data storage device 102 may obtain (e.g., receive or fetch) the write commands 170 from the submission queues 152. Before a particular write command is executed, it may be stored at the data storage device as a pending command (e.g., one of the first pending commands 122). When the particular write command is executed, pending data 160 associated with the particular write command may be stored at the non-volatile memory 104 or at the write cache 126. For example, the pending data 160 may be stored at the write cache 126 to aggregate the pending data 160 with other data to form full write blocks. After the particular write command is executed (e.g., after the pending data 160 associated with the particular write command is stored at the write cache 126), the data storage device 102 provides an indication to the accessing device 150 that the particular write command is complete (e.g., the complete indication 172). The particular write command may be indicated as a completed command 158 in a corresponding completion queue 156 (and thus is no longer a pending command).

After one or more write commands 170 are submitted to the submission queues 152, the accessing device 150 may issue a command instructing the data storage device 102 to write particular data to the non-volatile memory 104. As a first example, the command instructing the data storage device 102 to write particular data to the non-volatile memory 104 may be the flush command 174. In the first example, the particular data to be written to the non-volatile memory 104 includes all data in the write cache 126. In a second example, the command instructing the data storage device 102 to write particular data to the non-volatile memory 104 may be a FUA-enabled write command. In the second example, the particular data to be written to the non-volatile memory 104 includes data identified by the FUA-enabled write command.

In a particular embodiment, the write block filling unit 134 initializes the timer 140 when the command is received. A duration of the timer 140 may be selected based on a type of the command. For example, the timer 140 may be initialized to a first value (corresponding to a first duration) if the command is a flush command and may be initialized to a second value (corresponding to a second duration) if the command is a FUA-enabled write command. To illustrate, the timer 140 may be initialized to a longer duration for flush commands than for FUA-enabled write commands. In other embodiments, no timer is used.

After receiving the command (e.g., after obtaining the command from one of the submission queues 152), the write block filling unit 134 may begin attempting to generate a full write block of data (or multiple full write blocks of data). For example, the write block filling unit 134 may use the pending command evaluator 136 to determine how much data is needed to fill a particular partial write block, such as the first partial write block 130, the second partial write block 132, or both. To illustrate, the pending command evaluator 136 may determine a size of an unfilled portion of the first partial write block 130 (e.g., based on a size of a full write block and a size of data in the first partial write block 130). Likewise, the pending command evaluator 136 may determine a size of an unfilled portion of the second partial write block 132 (e.g., based on the size of the full write block and a size of data in the second partial write block 132). The pending command evaluator 136 may evaluate pending commands (e.g., the first pending commands 122, the second pending commands 154, or both) to identify pending data 160 that may be accessed and used to fill a partial write block.

In a particular embodiment, the pending command evaluator 136 may be configured to prioritize use of the pending commands to fill write blocks. For example, the pending command evaluator 136 may attempt to fill partial write blocks using pending data 160 associated with the first pending commands 122 before attempting to fill the partial write blocks using pending data 160 associated with the second pending commands 154 When a pending write command of the second pending commands 154 is identified that can be added to a partial write block, the write command is copied to the data storage device 102, which changes the write command from a second pending command 154 to a first pending command 122. Additionally, the pending data 160 associated with the write command is obtained from the accessing device 150 and aggregated with other data in the partial write block. The write command is indicated as complete (e.g., in one of the completion queues 156) when the pending data 160 associated with the write command is received.

If the pending command evaluator 136 is able to fill each write block according to the command (e.g., every partial write block 128 when the command is the flush command or a single full write block including data identified by a FUA-enabled write command), the full write block, or the full write blocks, are written to the non-volatile memory 104, and the data storage device 102 generates an indication that the command is complete (e.g., a complete indication 172 may be issued for a FUA-enabled write command or a committed indication 176 may be issued for a flush command 174). If the pending command evaluator 136 is not able to fill each write block according to the command before expiration of the timer 140, the write block filling unit 134 uses the padder 138 to add padding to fill the partial write block or partial write blocks.

Thus, the data storage device 102 is configured to efficiently utilize storage capacity of the non-volatile memory 104 by filling one or more write blocks of data with data associated with pending write commands after a flush command or FUA-enabled write command is received. Although the command processing unit 120, the write block filling unit 134, the pending command evaluator 136, the padder 138 and the timer 140 are described and illustrated as separate units, in some configurations, functionality of the command processing unit 120, the write block filling unit 134, the pending command evaluator 136, the padder 138 and the timer 140, or a combination thereof, may be provided by a single unit, such as a processor executing instructions to perform functions of the command processing unit 120, the write block filling unit 134, the pending command evaluator 136, the padder 138 and the timer 140, or a combination thereof. In other examples, one or more of the command processing unit 120, the write block filling unit 134, the pending command evaluator 136, the padder 138 and the timer 140 may correspond to or include application specific circuitry. To illustrate, the timer 140 may include or correspond to a clock circuit.

Figure 2:
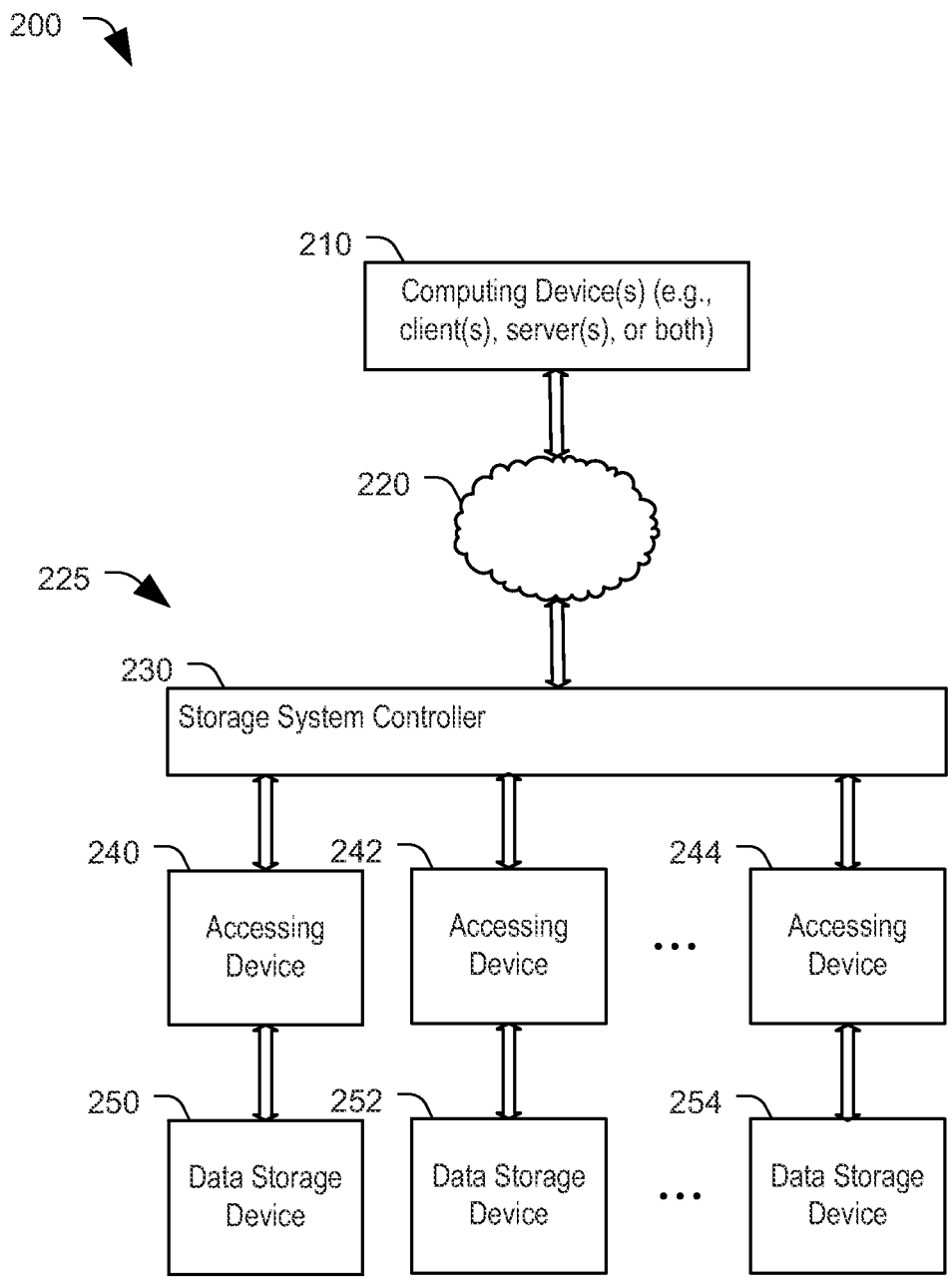
FIG. 2 is a block diagram of a second particular embodiment of a system including a plurality of data storage devices of a storage system, where at least one of the data storage devices is configured to attempt to fill a write block using data associated with pending write commands.

FIG. 2 is a block diagram of a second particular embodiment of a system 200 including a plurality of data storage devices of a storage system, where at least one of the data storage devices is configured to attempt to fill a write block using data associated with pending write commands. The system 200 includes one or more computing devices 210 coupled to a network 220. The one or more computing devices 210 may include client devices (e.g., a mobile computer device or a desktop computing device associated with a user), may include one or more servers (e.g., a content distribution network server, a server at a data center, or a server at an enterprise data system), or may include both clients and servers.

The one or more computing devices 210 may communicate via the network 220 with a networked data storage system 225. The networked data storage system 225 may include a cloud storage system, an enterprise data system, a network attached storage system, or another data storage system configured to store data received from the one or more computing devices 210, configured to provide stored data to the one or more computing devices 210, or a combination there.

The networked data storage system 225 may include a storage system controller 230. The storage system controller 230 may facilitate routing of data between the one or more computing devices 210 and particular data storage device(s) 250, 252, 254. The storage system controller 230 may also provide other functions, such as load balancing, striping of data across multiple data storage devices, data communication, data computation, etc.

The networked data storage system 225 also includes the data storage devices 250, 252, 254. One or more of the data storage devices 250, 252, 254 may correspond to the data storage device 102 of FIG. 1. For example, the data storage device 250 may include the write cache 126, the non-volatile memory 104, and the controller 106 of FIG. 1. In this example, the controller 106 of the data storage device 102 may be configured to, responsive to receiving a command to flush particular data from the write cache, attempt to fill a write block of data using the particular data and other data obtained after receipt of the command. In this example, the controller 106 of the data storage device 102 may also, or in the alternative, be configured to, responsive to receiving a FUA-enabled write command, attempt to fill a generate a full write block using data associated with the FUA-enabled write command and other data obtained after receipt of the FUA-enabled write command. To illustrate, a controller of the data storage device 250 may include the write block filling unit 134 of FIG. 1. The data storage device 252, the data storage device 254, or both, may also include a write cache, a non-volatile memory, and a controller, each of which may operate as described with reference to the write cache 126, the non-volatile memory 104, and the controller 106 of FIG. 1.

In a particular embodiment, each data storage device 250, 252, 254 may be associated with an accessing device (e.g., accessing devices 240, 242, 244, respectively). Each of the accessing devices 240, 242, 244 may operate as described with reference to the accessing device 150 of FIG. 1. In another embodiment, the storage system controller 230 provides the functions of the accessing device 150 of FIG. 1. For example, the submission queues 152, the completion queues 156, or both, may reside at the storage system controller 230. In this embodiment, one or more of the accessing devices 240, 242, 244 may be omitted. In yet another embodiment, the computing devices 210 function as accessing devices. For example, the submission queues 152, the completion queues 156, or both, may reside at the computing devices 210. In this embodiment, one or more of the accessing devices 240, 242, 244 may be omitted. Although FIG. 2 illustrates three data storage devices 250, 252, 254 and a corresponding set of three accessing devices 240, 242, 244, the networked data storage system 225 may include more than or fewer than three data storage devices and/or more than or fewer than three accessing devices.

Thus, the system 200 is configured to efficiently utilize storage capacity of non-volatile memory of multiple data storage devices of a networked data storage system by filling one or more write blocks of data with data associated with pending write commands responsive to a flush command or a FUA-enabled write command.

Figure 3:
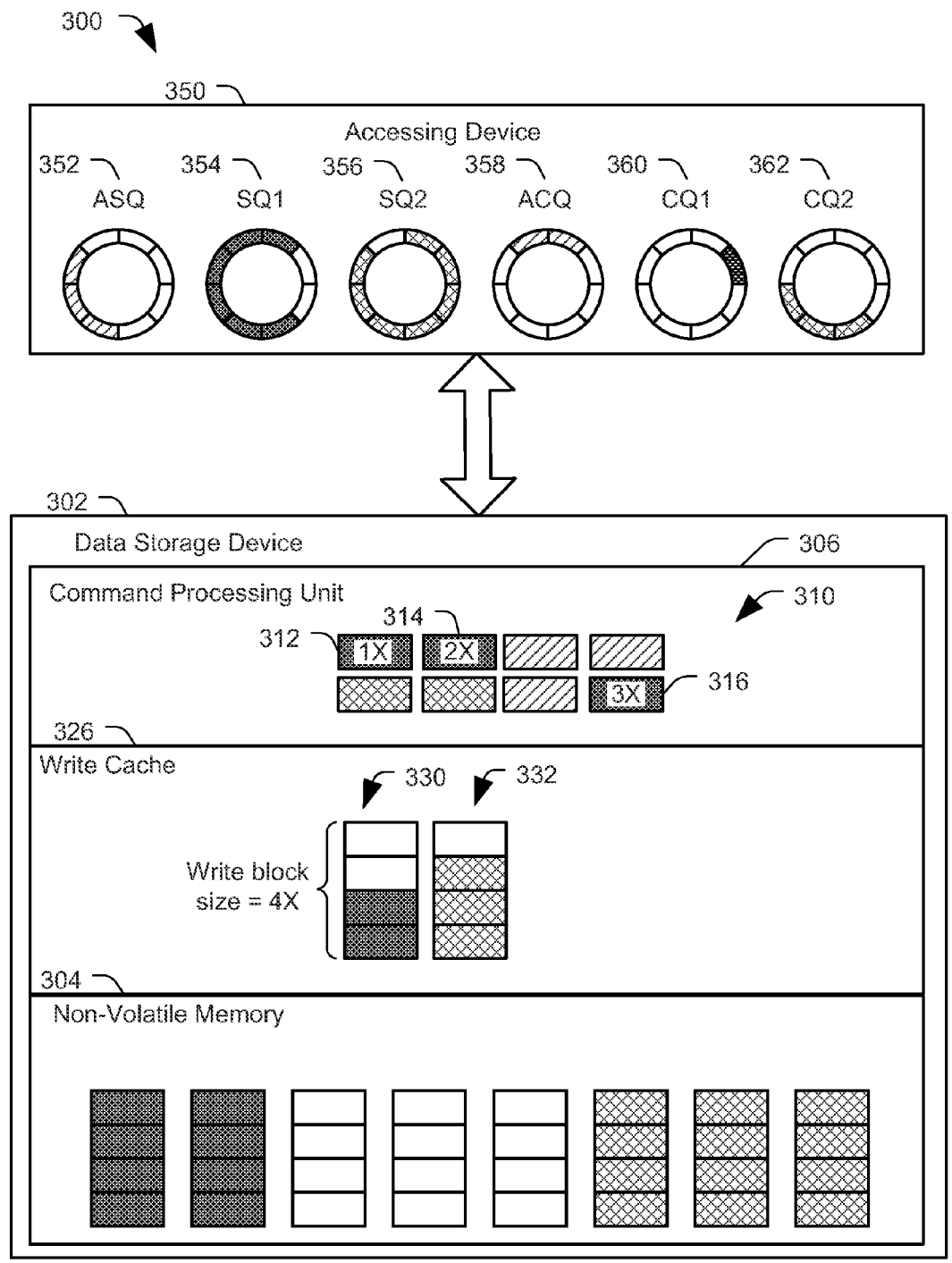
FIG. 3 is a block diagram of a third particular embodiment of a system including a data storage device configured to attempt to fill a write block using data associated with pending write commands.

FIG. 3 is a block diagram of a third particular embodiment of a system 300 including a data storage device 302 configured to attempt to fill a write block using data associated with pending write commands. The data storage device 302 includes a command processing unit 306, a write cache 326, and a non-volatile memory 304. The data storage device 302 may be coupled to (or accessible via a network to) an accessing device 350 (e.g., a host device or another device coupled to a network). The data storage device 302 may correspond to the data storage device 102 of FIG. 1 or to one or more of the data storage devices 250, 252, 254 of FIG. 2. FIG. 3 illustrates interactions among queues of the accessing device 350, the command processing unit 306, and the write cache 326.

In FIG. 3, the accessing device 350 includes a plurality of queues, including an administrative submission queue (ASQ) 352, an administrative completion queue (ACQ) 358, two submission queues (SQ1 and SQ2) 354, 356, and two completion queues (CQ1 and CQ2) 360, 362. In other embodiments, the accessing device 350 may include a different number of queues. For example, when the accessing device 350 executes multiple threads, each thread may have a corresponding submission queue. In another example, multiple submission queues may be associated with a single completion queue.

The accessing device 350 places commands into a submission queue (e.g., ASQ 352, SQ1 354 or SQ2 356). Each submission queue (e.g., ASQ 352, SQ1 354 and SQ2 356) is a circular buffer. The data storage device 302 fetches the commands from the submission queue in order (e.g., as arranged in the circular buffer); however, the data storage device 302 may execute the commands in any order. Thus, for example, in FIG. 3, the command processing unit 306 includes a set of pending commands 310 that have been fetched from queues of the accessing device 350 and are awaiting execution. The command processing unit 306 may determine an order of execution of the set of pending commands 310. In FIG. 3, cross-hatching is used to illustrate which commands and data are associated with each queue.

Each completion queue (e.g., ACQ 358, CQ1 360 and CQ2 362) is a circular buffer used to post status for completed commands. For example, after the data storage device 302 writes data associated with a particular write command to the write cache 326, the data storage device 302 may update a completion queue associated with the particular write command to illustrate the particular write command as complete.

The administrative queues (ASQ 352 and ACQ 358) are used by the accessing device 350 to control the data storage device 302 (e.g., to abort a command) and to control queues (e.g., to create or delete submission or completion queues). The non-administrative queues (e.g., SQ1 354, SQ2 356, CQ1 360 and CQ2 362) are referred to as Input/Output (I/O) queues. Administrative commands are submitted and completed via the control queues, and I/O commands (e.g., read and write commands) are submitted and completed via the I/O queues.

The write cache 326 may be used to aggregate data to fill write blocks of data before the full write blocks are written to the non-volatile memory 304. For example, in FIG. 3, the write cache 326 includes two partial write blocks, e.g., a first partial write block 330 and a second partial write block 332. In FIG. 3, a full write block is indicated to have a size of 4X units of data, where X represents a particular number of bits or bytes, such as 64 K bytes. The two partial write blocks 330 and 332 each include fewer than 4X units of data. Write commands issued by the accessing device 350 may include or identify various quantities of data to be written. For example, in FIG. 3, a first pending write command 312 is associated with 1X units of data (e.g., 16 K bytes), a second pending write command 314 is associated with 2X units of data (e.g., 32 K bytes), and a third pending write command 316 is associated with 3X units of data (e.g., 48 K bytes). After a full write block of data is formed in the write cache 326, the full write block of data is written to the non-volatile memory 304.

In certain circumstances, the accessing device 350 may issue a flush command. The flush command instructs the data storage device 302 to write all data that is stored in the write cache 326 (e.g., all data associated with a write command indicated as complete) to the non-volatile memory 304. After the data in the write cache 326 is written to the non-volatile memory 304, the data storage device 302 may generate an output indicating completion of the flush command. For example, the data storage device 302 may provide a committed indication. The committed indication may indicate to the access device 350 that all data associated with write commands previously identified in a completion queue has been written to the non-volatile memory 304.

When the flush command is received, the write cache 326 may include partial write blocks. In a particular embodiment, the data storage device 302 of FIG. 3 attempts to fill the partial write blocks 330, 332 using pending data (e.g., data associated with one or more pending write commands) to generate full write blocks before writing the write blocks to the non-volatile memory 304. For example, as illustrated in FIG. 3, the first partial write block 330 includes 2X units of data; thus, 2X more units of data are needed to fill the first partial write block 330 to generate a full write block. The data storage device 302 may evaluate the pending commands 310 to determine whether any of the pending commands 310 is a write command associated with data that could be used to fill the first partial write block. In the example illustrated, the first pending write command 312 includes or is associated with 1x unit of data. Thus, the 1x units of data associated with the first pending write command 312 could be added to the first partial write block 330, but a full write block would not result since 1x additional data would be needed. The third pending write command 316 includes or is associated with 3X unit of data. Thus, the 3X units of data associated with the third pending write command 316 could not be added to the first partial write block 330. However, the second pending write command 314 includes or is associated with 2X unit of data. Thus, the 2X units of data associated with the second pending write command 314 could be added to the first partial write block 330 to generate a full write block. Accordingly, in response to the flush command, the data storage device 302 may obtain pending data associated with the second pending write command 314 and may aggregate the pending data with the first partial write block 330 to form a full write block. The full write block may then be written to the non-volatile memory 304.

If no pending command of the pending commands 310 is associated with data that could be added to the first partial write block 330 to form a full write block, the data storage device 302 may check pending commands that are identified in the submission queues 354, 356 of the accessing device 302. If no pending command of the pending commands 310 and no pending command identified in the submission queues 354, 356 is associated with data that could be added to the first partial write block 330 to form a full write block, the data storage device 302 may fill the first partial write block 330 to the extent possible, e.g., using data associated with the first pending write command 312, and, upon expiration of a timer, fill a remaining portion of the first partial write block 330 with padding.

Another mechanism that the accessing device 350 may use to track which data is written to the non-volatile memory 304 is a force unit access (FUA) flag. When a write command, such as the write command 170 of FIG. 1, includes a FUA flag (e.g., is a FUA-enabled write command), the command processing unit 306 does not provide a complete indication to a completion queue associated with the FUA-enabled write command until the data associated with the FUA-enabled write command has been written to the non-volatile memory 304.

When the data storage device 302 receives a FUA-enabled write command, the data storage device 302 may determine whether data associated with the FUA-enabled write command can be used to fill one of the partial write blocks 330, 332. If the data can be used to generate a full write block, the data is added to a partial write block and the resulting full write block is written to the non-volatile memory 304. If the data can be used to generate a full write block, the data storage device 302 determines whether the data associated with the FUA-enabled write command can be combined with data associated with a pending write command 310 or a pending write command identified at a submission queue of the accessing device 350. Accordingly, in response to the FUA-enabled write command, the data storage device 302 may obtain pending data associated with a pending write command and may aggregate data associated with the FUA-enabled write command with the pending data, with data of a partial write block in the write cache, or with both, to form a full write block (or write block that includes data received at the data storage device 320 after the FUA-enabled write command or the flush command was received). The full write block may be written to the non-volatile memory 304. If no pending command of the pending commands 310 and no pending command identified in the submission queues 354, 356 is associated with data that could be added to the data associated with the FUA-enabled write command to form a full write block, the data storage device 302 may, upon expiration of a timer, generate a full write block using the data associated with the FUA-enabled write command and padding.

Thus, the data storage device 302 is configured to efficiently utilize storage capacity of the non-volatile memory 304 by filling (or attempting to fill) one or more write blocks with data associated with pending write commands after a flush command or after a FUA-enabled write command is received.

Figure 4:
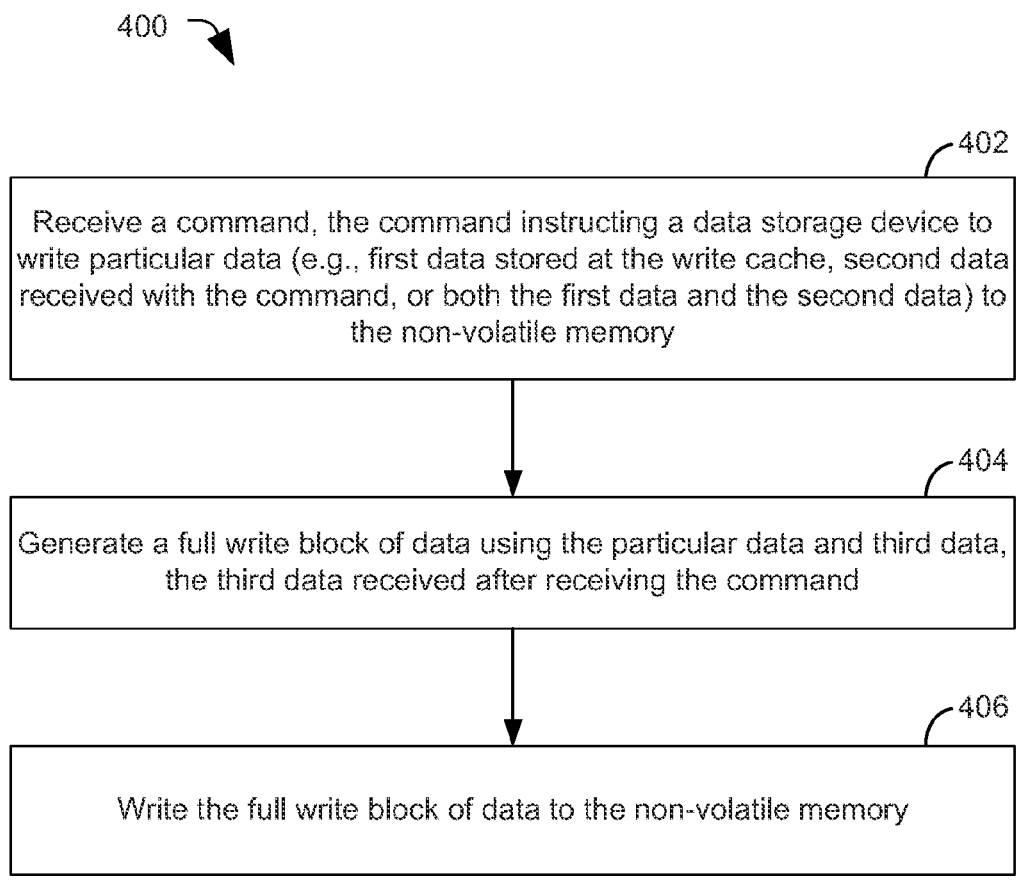
FIG. 4 is a flow diagram illustrating a first particular embodiment of a method of filling a write block using data associated with pending write commands.

FIG. 4 is a flowchart illustrating a first particular embodiment of a method 400 of filling a write block using data associated with pending write commands. The method 400 may be performed at a data storage device. The data storage device may correspond to the data storage device 102 of FIG. 1, one or more of the data storage devices 250, 252, 254 of FIG. 2, the data storage device 302 of FIG. 3, or a combination thereof. For example, the method 400 may be performed by the controller 106 of FIG. 1 by a controller of one of the data storage devices 250, 252, 254 of FIG. 2, or by a controller of the data storage device 302 of FIG. 3.

The method 400 includes, at 402, receiving a command from an accessing device where the command instructs the data storage device to write data stored at the write cache (e.g., first data), data received with the command (e.g., second data), or both, to the non-volatile memory. For example, the accessing device 150 may submit multiple write commands (e.g., the write command 170) to the submission queue 152. The command processing unit 120 of the controller 106 may read the write commands from the submission queue 152 and stage (e.g. store) each write command as a pending command. For example, data associated with each write command may be staged (e.g. stored) at the write cache 126 temporarily (e.g., until the data fills a write block). In this example, the command may include a flush command 174 to write the data stored in the write cache 126 to the non-volatile memory 104. In another example, the command may include a write command with a force unit access (FUA) flag. In this example, the FUA flag indicates that the controller 106 is not to return a complete indication associated with the write command until the data associated with the write command is written to the non-volatile memory 104. Although flush commands and FUA-enabled write commands are discussed as specific examples, the method 400 may be formed responsive to receiving other commands, such as other commands that would otherwise result in adding padding to a write block of data before writing the write block of data to the non-volatile memory.

The method 400 also includes, at 404, generating a full write block of data using the particular data. The full write block of data may also be generated using data associated with at least one pending write command (e.g., third data), data of a partial write block of data (e.g., data associated with a completed write command), or both. The third data may be received from the accessing device after receiving the command. For example, while data is staged at the write cache 126, the accessing device 150 may issue the flush command 174. In response to the flush command 174, the controller 106 may combine data associated with a pending write command (e.g., a write command identified in the submission queue or a write command that is staged for which data has not yet been written to the write cache 126) with data in the write cache 126 to fill a write block. In another example, if the command includes a FUA-enabled write command, the controller 106 may combine a pending write command (e.g., a write command identified in the submission queue or a write command that is staged for which data has not yet been written to the write cache 126) with the data associated with the FUA-enabled write command to fill the write block. The method 400 also includes, at 406, writing the full write block of data to the non-volatile memory.

Thus, the method 400 enables a data storage device to efficiently utilize storage capacity of the memory by filling one or more write blocks of data with data associated with pending write commands after a flush command or a force unit access flag enabled write command is received.

Figure 5:
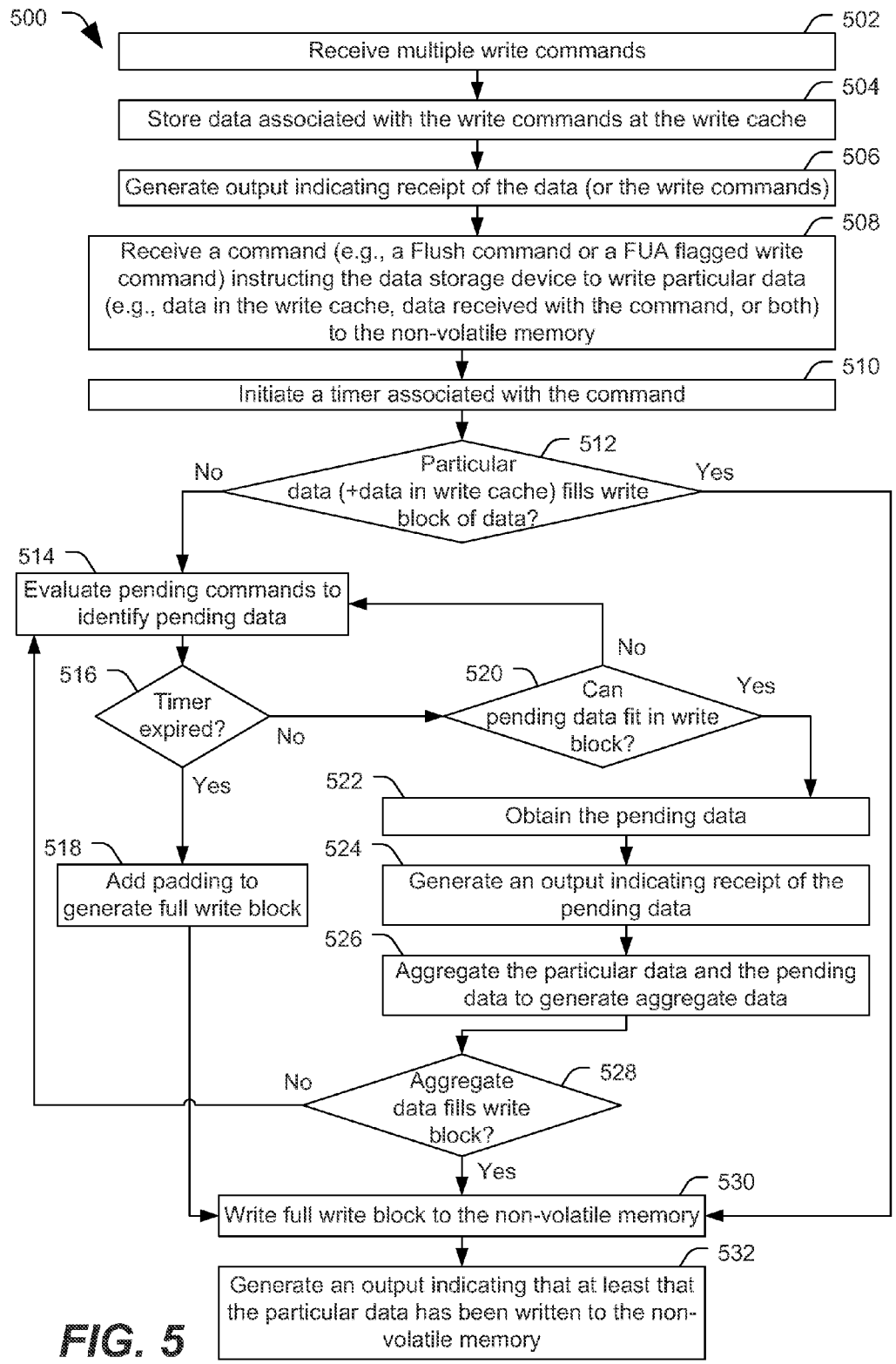
FIG. 5 is a flow diagram illustrating a second particular embodiment of a method of filling a write block using data associated with pending write commands.

FIG. 5 is a flowchart illustrating a second particular embodiment of a method 500 of filling a write block using data associated with pending write commands. The method 500 may be performed at a data storage device. The data storage device may correspond to the data storage device 102 of FIG. 1, one or more of the data storage devices 250, 252, 254 of FIG. 2, the data storage device 302 of FIG. 3, or a combination thereof. For example, the method 500 may be performed by the controller 106 of FIG. 1, by a controller of one of the data storage devices 250, 252, 254 of FIG. 2, or by a controller of the data storage device 302 of FIG. 3.

The method 500 includes receiving multiple commands, at 502, and staging (e.g., storing) data associated with write commands of the multiple commands at the write cache, at 504. For example, the accessing device 150 may provide multiple write commands (e.g., the write commands 170) to the submission queue 152. The command processing unit 120 of the controller 106 may fetch the write commands from the submission queue 152 and stage (e.g. store) each write command as a pending command. When a write command is executed, data associated with the write command may be staged (e.g. stored) at the write cache 126 temporarily (e.g., until the data fills a write block). The method 500 includes, at 506, generating an output indicating receipt of the first data. The output may be used to update a completion queue associated with the at least one write command. For example, the completion queues 156 of FIG. 1 may be updated responsive to the complete indication 172.

The method 500 includes, at 508, receiving a command instructing the data storage device to write particular data to the non-volatile memory. For example, the command may include the flush command 174 or a FUA-enabled write command. When the command is a flush command, the particular data to be written to the non-volatile memory includes data staged in the write cache. When the command is a FUA-enabled write command, the particular data to be written to the non-volatile memory includes data received with or identified by the FUA-enabled write command.

In a particular embodiment, the method 500 includes, at 510, initiating (e.g., starting) a timer associated with the first command. A duration of the timer may be selected based on the type of the command. For example, the timer 140 may be initialized to a first value (corresponding to a first duration) if the command is a flush command and may be initialized to a second value (corresponding to a second duration) if the command is a FUA-enabled write command. In another embodiment, no timer is used. In this embodiment, steps 516 and 518 may be omitted from the method 500, as described below.

The method 500 may include, at 512, determining, based on a size of the particular data (e.g., the data in the write cache and/or the data associated with the FUA-enabled write command) and a size of a write block of data, whether the particular data, alone or in combination with staged data at the write cache, fills the write block of data. For example, when the command is a FUA-enabled write command including or identifying write data, the determination at 512 may be whether the write data can be combined with other data that is in the write cache to form a full write block. If the particular data, alone or in combination with staged data at the write cache, fills the write block of data, the method 500 includes, at 530, writing the full write block to the non-volatile memory and, at 532, generating an output indicating that at least that the particular data has been written to the non-volatile memory.

If the particular data, alone or in combination with staged data at the write cache, does not fill the write block of data, the method 500 includes, at 514, evaluating pending commands to identify pending data. For example, the pending command evaluator 136 of FIG. 1 may determine a size of an unfilled portion of a partial write block in the write cache 126 (e.g., based on a size of a full write block and a size of data in the first partial write block 130). The pending command evaluator 136 may evaluate pending commands to identify pending data 160 to fill a partial write block. When the timer is used, the method 500 also includes, at 516, determining whether the timer has expired. If the timer has expired, the method 500 includes, at 518, adding padding to generate a full write block. The method 500 may further include, at 530, writing the full write block to the non-volatile memory and, at 532, generating an output indicating that at least that the particular data (e.g., the data in the write cache and/or the data associated with the FUA-enabled write command) has been written to the non-volatile memory.

If the timer has not expired or is not used, the method 500 includes, at 520, determining (e.g., based on a size of the particular data, sizes of the pending data, and a size of a write block) whether the pending data identified at 514 can be combined with the particular data within the write block. If the pending data cannot be combined with the particular data within the write block, the method 500 returns, to 514, to identify other pending data. If the pending data can be combined with the particular data within the write block, the method 500 includes, at 522, obtaining the pending data. For example, the controller 106 of FIG. 1 may obtain the pending data 160 from the accessing device 150 to fill the write block. The method 500 may also include, at 524, generating an output indicating receipt of the pending data. For example, the output may be used to update a completion queue associated with the pending data.

The method 500 may also include, at 526, aggregating the particular data and the pending data to generate aggregate data, and determining, at 528, whether the aggregate data fills the write block. If the aggregate data does not fill the write block, the method 500 returns to 514 to continue to evaluate pending commands until the write block is filled or until the timer expires. If the aggregate data fills the write block, the method 500 includes, at 530, writing the full write block to the non-volatile memory and, at 532, generating an output indicating that at least that the particular data (e.g., the data in the write cache and/or the data associated with the FUA-enabled write command) has been written to the non-volatile memory.

Thus, the method 500 enables a data storage device to efficiently utilize storage capacity of the memory by filling one or more write blocks of data with data associated with pending write commands after a flush command or a force unit access flag enabled write command is received.

Although various components depicted herein are illustrated as block components and described in general terms, such components may include one or more microprocessors, state machines, or other circuits configured to enable a data storage device, such as the data storage device 102 of FIG. 1, one or more of the data storage devices 250, 252, 254 of FIG. 2, or the data storage device 302 of FIG. 3, to perform the particular functions attributed to such components, or any combination thereof. Components described herein may be operationally coupled to one another using one or more nodes, one or more buses (e.g., data buses and/or control buses), one or more other structures, or a combination thereof. One or more components described herein (e.g., the controller 106 of FIG. 1) may represent physical components, such as hardware controllers, state machines, logic circuits, or other structures.

The controller 106, the command processing unit 120, the write block filling unit 134, or the command processing unit 306 may be implemented using a microprocessor or microcontroller programmed to attempt to fill a write block using data associated with pending write commands (e.g., using one or more operations of the method 400 of FIG. 4 or the method 500 of FIG. 5). In a particular embodiment, the controller 106, the command processing unit 120, the write block filling unit 134, or the command processing unit 306 includes a processor executing instructions that are stored at the non-volatile memory 104 or the non-volatile memory 304. Alternatively, or in addition, executable instructions that are executed by the processor may be stored at a separate memory location that is not part of the non-volatile memory 104 or the non-volatile memory 304, such as at a read-only memory (ROM) (not shown).

To further illustrate, a controller (e.g., the controller 106) may include a processor that is configured to execute instructions to perform certain operations described herein. The processor may include an execution unit operable to execute the instructions. The processor may execute instructions to receive commands or to process received commands from an accessing device (e.g., to receive the write commands 170). For example, the processor may execute one or more instructions related to a communication protocol, such as instructions to implement a NVMe specification, a PCI Express specification, a JEDEC industry specification, such as an eMMC specification, a Universal Flash Storage (UFS) specification, a USB specification, a SD specification, or a network communication protocol (e.g., FTP). The processor may further execute the instructions to receive a command to write particular data (e.g., first data stored at the write cache, second data received with the command, or both the first data and the second data) to the non-volatile memory. For example, the command may include a flush command or a FUA-enabled write command. The processor may further execute the instructions, after receiving the command, to generate a full write block of data using the particular data and third data, the third data obtained after receiving the command. For example, the processor may execute one or more instructions to evaluate a set of pending commands to identify pending data that is associated with pending write commands, to determine, based on a size of the particular data, sizes of the pending data, and a size of a write block, whether the pending data can be aggregated with the particular data within the write block, and, if the pending data can be combined with the particular data within the write block, to use the pending data as the third data to generate the full write block of data. The processor may further execute the instructions to write the full write block of data to the non-volatile memory.

The data storage device 102, one or more of the data storage devices 250, 252, 254, or the data storage device 302 may be attached to or embedded within one or more accessing devices, such as within a housing of a portable communication device. For example, the data storage device 102, one or more of the data storage devices 250, 252, 254, or the data storage device 302 may be within a packaged apparatus, such as a wireless telephone, a personal digital assistant (PDA), gaming device or console, a portable navigation device, or other device that uses internal non-volatile memory. In other embodiments, the data storage device 102, one or more of the data storage devices 250, 252, 254, or the data storage device 302 may be a portable device configured to be selectively coupled to one or more external devices. In still other embodiments, the data storage device 102, one or more of the data storage devices 250, 252, 254, or the data storage device 302 may be components (e.g., solid-state drives (SSDs) of a network accessible data storage system, such as an enterprise data system, a network-attached storage system, a cloud data storage system, etc.

To further illustrate, a data storage device (e.g., the data storage device 102, one or more of the data storage devices 250, 252, 254, or the data storage device 302) may be configured to be coupled to an accessing device (e.g., the accessing device 150, one or more of the accessing devices 240, 242, 244, or the accessing device 350) as embedded memory, such as in connection with an embedded Multi-Media Card (eMMC®) (trademark of JEDEC Solid State Technology Association, Arlington, Va.) configuration, as an illustrative example. The data storage device may correspond to an eMMC device. As another example, the data storage device may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device may operate in compliance with an industry specification. For example, the data storage device may operate in compliance with a NVMe specification, a JEDEC eMMC specification, a JEDEC Universal Flash Storage (UFS) specification, one or more other specifications, or a combination thereof. Alternatively, the data storage device may be a component of networked data storage system, and may communicate via a network using a network protocol, such as a Network File System (NFS) protocol, a Common Internet File System (CIFS) protocol, a Hypertext Transfer Protocol (HTTP), a Hypertext Transfer Protocol Secure (HTTPS), a File Transfer Protocol (FTP), a Secure File Transfer Protocol (SFTP), a Point to Point Protocol (PPP), an Internet Protocol (IP), a Transmission Control Protocol (TCP), another communication protocol, or a combination thereof.

In particular embodiments, a memory (e.g., the non-volatile memory 104, the memory 124, or the non-volatile memory 304) includes a three-dimensional (3D) memory, such as a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), or a combination thereof. Alternatively or in addition, the memory may include another type of memory. The memory may include a semiconductor memory device.

Semiconductor memory devices include volatile memory devices (e.g., the write cache 126 of FIG. 1), such as dynamic random access memory ("DRAM") or static random access memory ("SRAM") devices, non-volatile memory devices (e.g., the non-volatile memory 104 of FIG. 1), such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used to facilitate operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device comprising:
   a write cache; and
   a controller configured to, responsive to receiving a command to flush the write cache, generate a write block that includes at least data stored at the write cache and pending data related to one or more pending unexecuted write instructions, the pending data stored at a location distinct from the write cache.

2. The device of claim 1, wherein the controller is configured to:
   compare a size of the data stored at the write cache to a size of the write block to determine a size of an unfilled portion of the write block; and
   compare sizes of the pending data related to the one or more pending unexecuted write instructions to the unfilled portion of the write block to identify a the pending data to aggregate with the data stored at the write cache to generate the write block.

3. The device of claim 2, the one or more pending unexecuted write instructions comprising first pending unexecuted write instructions and second pending unexecuted write instructions, wherein the first pending unexecuted write instructions correspond to pending unexecuted write instructions that, when the write instructions are received, are identified in a submission queue of an accessing device and are identified at the controller, and wherein the second pending unexecuted write instructions correspond to pending unexecuted write instructions that, when the write instructions are received, are identified in the submission queue of the accessing device and are not identified at the controller.

4. The device of claim 3, wherein the controller is further configured to compare sizes of write data of the first pending unexecuted write instructions to the unfilled portion of the write block, and to compare sizes of write data of the second pending unexecuted write instructions to the unfilled portion of the write block in response to the write data of the first pending unexecuted write instructions failing to fill the write block.

5. The device of claim 1, wherein the controller is further configured to initiate a timer responsive to receiving the command, wherein in response to the timer expiring before the controller is able to fill the write block using the data stored at the write cache and the pending data, the controller is configured to generate a full write block including the data stored at the write cache and padding and to write the full write block to a non-volatile memory.

6. The device of claim 1, wherein the command is a flush command and the data stored at the write cache corresponds to one or more write instructions that are identified in a submission queue of an accessing device and that are identified in a completion queue of the accessing device.

7. A method comprising:
   receiving a command, the command instructing writing of particular data to a non-volatile memory, wherein the particular data includes first data stored at a write cache, second data received with the command, or both;
   responsive to receiving the command, generating a full write block using the particular data and third data, the third data corresponding to one or more unexecuted write commands that are identified in a submission queue of an accessing device; and
   writing the full write block to the non-volatile memory.

8. The method of claim 7, further comprising, before receiving the command:
   receiving at least one write command, the at least one write command identifying the first data;
   storing the first data at the write cache; and
   generating an output indicating receipt of the first data, wherein the output is used to update a completion queue associated with the at least one write command.

9. The method of claim 7, further comprising:
   initiating a timer responsive to receiving the command; and
   upon expiration of the timer, aggregating the particular data, the third data, and padding to generate the full write block.

10. The method of claim 9, wherein the timer is initiated according to a first duration if the command is a flush command and the timer is initiated according to a second duration if the command is a write command with a force unit access flag.

11. The method of claim 7, wherein generating the full write block comprises:
    evaluating a set of pending commands to identify pending data that is associated with pending unexecuted write commands;
    determining, based on a size of the particular data, sizes of the pending data, and a size of a write block, whether the pending data can be aggregated with the particular data within the write block; and
    in response to determining that the pending data can be combined with the particular data within the write block, using the pending data as the third data to generate the full write block.

12. The method of claim 11, wherein the pending unexecuted write commands include at least one pending unexecuted write command identified at a command processing unit of a data storage device, and wherein the pending unexecuted write commands are not identified in a completion queue of an accessing device.

13. The method of claim 11, wherein using the pending data as the third data includes:
    causing a completion queue associated with the pending data at an accessing device to be updated; and
    aggregating the particular data and the pending data to generate aggregate data.

14. The method of claim 13, further comprising:
    determining whether the aggregate data fills the write block; and
    responsive to determining that the aggregate data does not fill the write block, aggregating additional pending data with the aggregate data to generate the full write block.

15. The method of claim 7, further comprising, after writing the full write block to the non-volatile memory, generating an output indicating that at least the particular data has been written to the non-volatile memory.

16. The method of claim 7, wherein the full write block comprises the second data identified by the command and data associated with a partial write block stored at the write cache.

17. A device comprising:
    means for storing data to be written to a non-volatile memory; and
    means for generating, responsive to receiving a particular write command that identifies particular data and that includes a flag indicating a completion indication condition, a write block that includes at least the particular data and pending data received after receipt of the particular write command.

18. The device of claim 17, wherein the pending data is accessible at a location that is distinct from the means for storing, and wherein the particular write command comprises a force unit access (FUA)-enabled write command.

19. The device of claim 17, further comprising means for processing commands, wherein the data is related to pending unexecuted write commands that are identified at the means for processing commands, are identified in a submission queue of an accessing device, or both.

20. The device of claim 17, wherein the means for generating is configured to include padding in the write block in response to expiration of a timer that is initiated responsive to receipt of the particular write command.

* * * * *